Patented Mar. 12, 1946

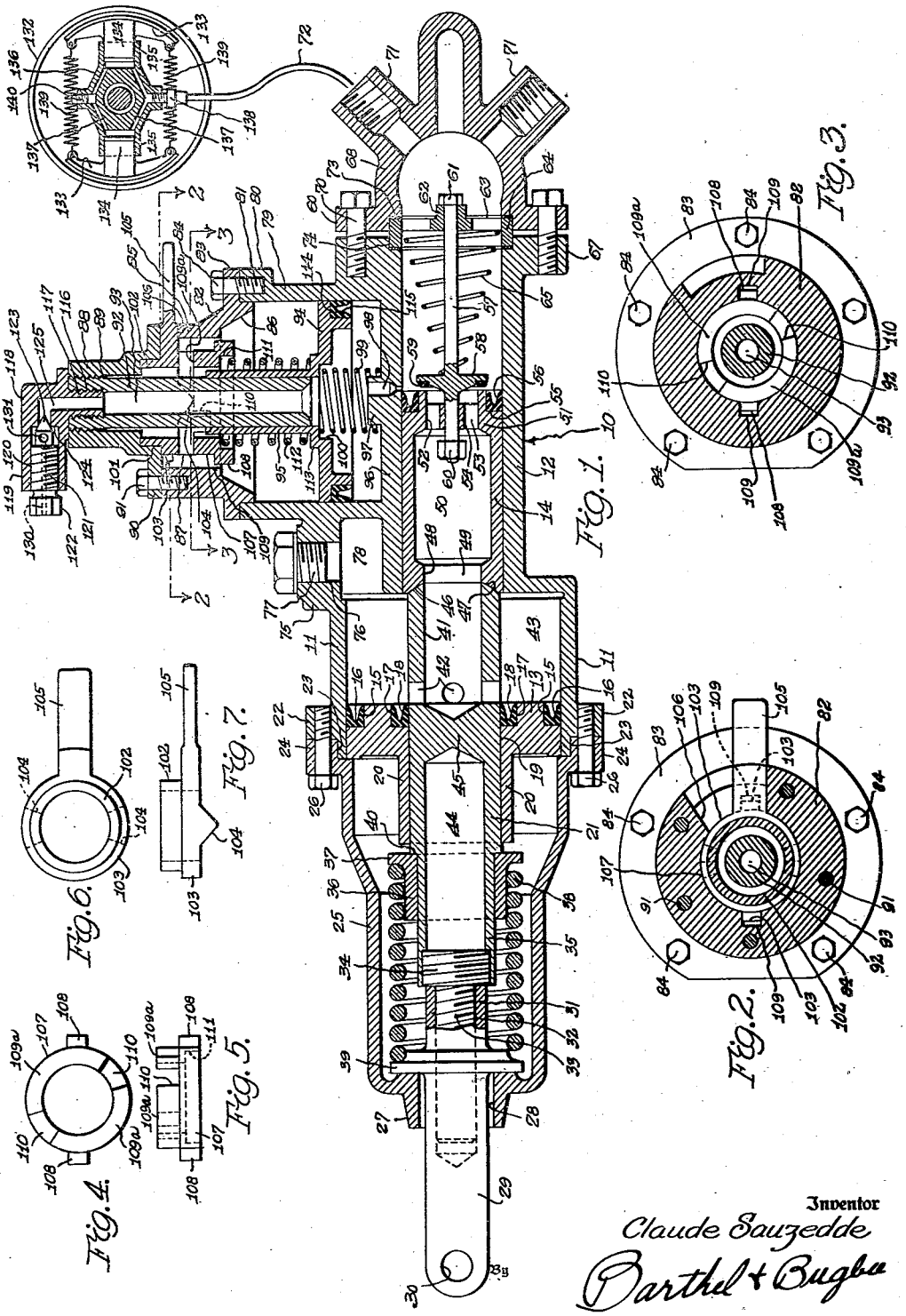
March 12, 1946.  C. SAUZEDDE  2,396,536
HYDROSTATIC BRAKE SYSTEM
Filed Dec. 10, 1942  2 Sheets-Sheet 1
Inventor
Claude Sauzedde
Barthel + Bugbee
Attorneys

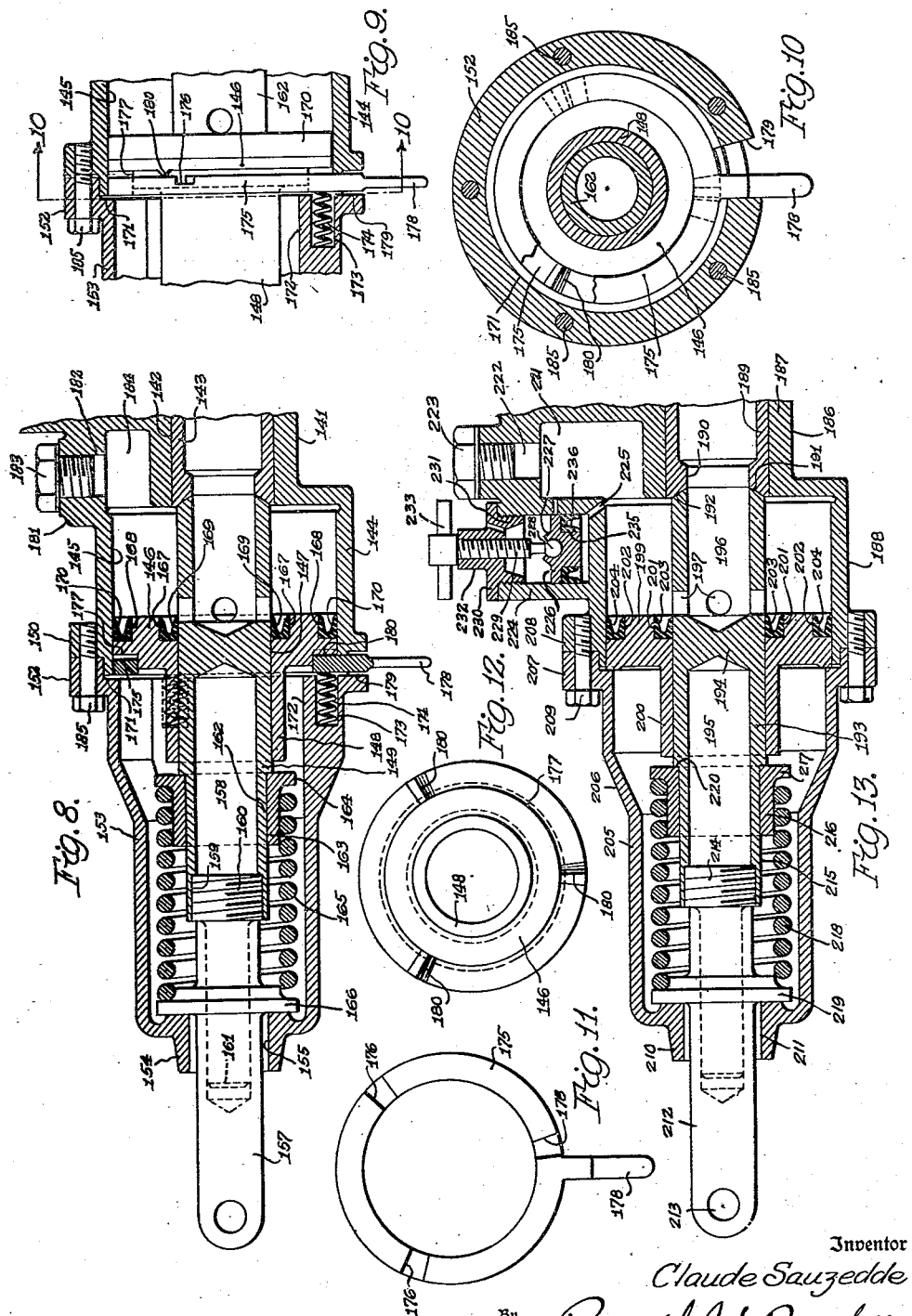

2,396,536

UNITED STATES PATENT OFFICE 2,396,536

HYDROSTATIC BRAKE SYSTEM

Claude Sauzedde, Detroit, Mich., assignor to Detroit Hydrostatic Brake Corporation, Detroit, Mich., a corporation of Michigan Application December 10, 1942, Serial No. 468,498

3 Claims. (Cl. 60—54.5)

The present invention relates to hydrostatic brake systems and more particularly to an expansible fluid seal therefor.

The primary object of the invention is to provide a hydrostatic brake system with means associated therewith for creating a sealing pressure in the system during non-use of the hydrostatic brakes to prevent escape of brake fluid and to facilitate the use of self expanding sealing elements throughout the system whereby the sealing elements will be maintained in tight sealing engagement by the sealing pressure during non-use and will be held in tight sealing contact when the brakes are applied by the developed pressure in the system.

Another object of the invention is to provide a multi-stage compressor for hydro-static brake systems having differential pistons which are sealed against the escape of brake fluid by self expanding sealing elements formed of rubber or compositions thereof such as neoprene.

Another object of the invention is to provide a compressor unit for hydrostatic brake systems having associated therewith means for creating a sealing pressure in the compressor unit as well as in the whole system to likewise provide a sealing pressure at other locations in the system such as the brake expanding pistons and parts incident thereto.

Another object of the invention resides in providing a hydrostatic brake system with manual means for creating a sealing pressure in the system after the system has been filled or replenished with brake fluid to insure complete filling of the system and the exclusion of air therefrom.

Another object of the invention is to provide a hydrostatic brake system including a compressor unit having differential pressure pistons for transmitting fluid under pressure to the brake cylinders in which the pressure and brake pistons are sealed against leakage of brake fluid by self expanding sealing elements, whereby a more efficient system will be provided having an increased life and requiring a minimum amount of repair work throughout its life and operation.

Other objects and advantages of the invention will become apparent during the course of the following description of the accompanying drawings, wherein:

Figure 1 is a longitudinal sectional view of a multi-stage compressor for fluid brake systems illustrating in detail one embodiment of the invention as applied thereto.

Figure 2 is a horizontal cross sectional view taken on line 2—2 of Fig. 1 looking in the direction of the arrows showing the manual control for creating sealing pressure in the compressor and system.

Figure 3 is a horizontal cross sectional view taken on line 3—3 of Fig. 1 looking in the direction of the arrows illustrating the manner in which the pressure cam receiving recesses are arranged on the movable tension collar.

Figure 4 is a top plan view of the tension collar further showing in detail the position of the cam receiving recesses.

Figure 5 is a side elevational view of the tension collar showing the lugs on diametrically opposed sides for preventing rotation thereof.

Figure 6 is a top plan view of the manual control member for producing sealing pressure within the multi-stage compressor and brake system.

Figure 7 is a side elevational view of the manual control member shown in Figure 6.

Figure 8 is a longitudinal cross-sectional view of a modified form of the invention illustrating the invention as applied to one of the pistons of the multi-stage compressor.

Figure 9 is a fragmentary cross sectional view through a portion of the compressor illustrating the pressure creating device in detail.

Figure 10 is a vertical cross-sectional view taken on line 10—10 of Fig. 9 looking in the direction of the arrows illustrating in detail the position and arrangement of the sealing pressure creating device.

Figure 11 is a plan view of the manual control device for creating pressure in the brake system and multi-stage compressor.

Figure 12 is an end elevational view of one of the compressor pistons illustrating the manner in which the same is annularly cut away and provided with cam facets so as to cooperate with the manual control device, and Figure 13 is a fragmentary longitudinal cross sectional view of another modification of the invention and showing in detail the manner in which the same is associated with the compressor housing.

General description of the invention

In general, the invention comprises a hydrostatic brake system employing a multi-stage or similar compressor in communication with the working pistons of the brakes of a motor vehicle wherein one or more of the pistons of the compressor and working pistons may be provided with self expanding sealing elements to prevent the escape of fluid from one side of the pistons to the other during the operating stroke of the compressor. Further, the invention consists in providing means for creating a sealing pressure in the compressor and working cylinders of the hydrostatic brake system to expand the sealing elements into tight sealing contact with their cooperating parts during non-use of the vehicle brakes thereby preventing leakage of the brake fluid between operating intervals and eliminating the loss of fluid from the system. In the preferred embodiment of the invention, the means for creating a sealing pressure is associated with one of the compensating pistons carried by the compressor and includes a manually operable device for moving the piston a predetermined distance to increase the pressure in the system within the limits of the brake shoe restraining springs.

In another form of the invention the sealing pressure producing means is coupled with one of the operating pistons of the compressor unit so that the compressor piston may be advanced a predetermined distance to create a sealing pressure within the system slightly less than the force of the brake shoe retaining springs.

Another form of the invention provides an independent cylinder and piston in communication with the compressor unit and brake system which may be manually operated to produce a sealing pressure in the system sufficient to maintain the sealing elements in close contact with their cooperating elements but insufficient to overcome the pressure of the brake shoe restraining springs. In all of the forms of the invention it is to be noted that the brake system may be filled when the sealing pressure devices are retracted so that the system receives an adequate amount of brake fluid before the sealing pressure is created. During the intervals between brake applications, the sealing pressure will maintain the sealing elements in their expanded position while the pressure developed during brake application likewise will act upon the sealing elements to cause expansion thereof in proportion to the pressure developed.

*Detailed description of the invention*

In the drawings wherein for the purpose of illustrating the invention and wherein like reference characters will be employed to designate like parts throughout the same, attention is directed to Figs. 1 to 7 inclusive wherein the reference character 10 will generally be employed to designate the master cylinder of a hydrostatic brake system. The master cylinder includes differential cylinder portions 11 and 12 in which is reciprocably mounted differential pistons 13 and 14 respectively. The differential piston 13 is provided with a peripheral chamber portion 15 for receiving an expansible flexible sealing element 16 formed of rubber or a similar composition such as neoprene.

Likewise the piston 13 is provided with an annular cutaway portion 17 for receiving a flexible and expansible sealing element 18. The expansible sealing element 18 and sealing element 16 are annular in formation and are mounted on the plunger side of the piston 13 so as to expand under pressure to create a sealing contact at the points of sealing. The piston 13 is provided with a central bore 19 surrounded by an annular sleeve 20 forming a guide on a tubular plunger rod 21.

The cylinder 11 is provided with a flange 22 adjacent its open end and is chambered as at 23 for receiving a similar flanged portion 24 on a casing section 25. Bolts 26 are provided for securing the flanges 22 and 24 together to exclude moisture and foreign matter from the interior of the casing 25. The free end of the casing 25 terminates in a cylindrical boss 27 having an opening 28 for the passage of a plunger rod 29. The plunger 29 is provided with an aperture 30 to which the brake pedal control link may be connected in the usual manner. The inner end 31 of the plunger rod 29 is internally screw-threaded as at 32 for receiving an elongate threaded stud 33 threadedly connected as at 34 to the outer end of the plunger 21 to facilitate the easy assembling of the plunger 21 and piston rod 29. Suitably mounted on a reduced portion 35 of the plunger 21 is a collar 36 having an annular flange 37 against which abuts at one end a coil spring 38 the opposite end of which is mounted in abutting relationship with an annular flange 39 formed integral with the plunger rod 29. The coil spring 38 is compressed between the flanges 37 and 39 and urges the collar 36 against the shoulder 40 formed by the reduced portion 35 of the plunger rod 21.

The opposite end of the plunger rod 21 is provided with a longitudinal bore 41 communicating with radial ports 42 and the compression chamber 43 on the pressure side of the piston 13. The plunger 21 has its opposite end provided with a similar longitudinal bore 44 which is separated and divided from the bore 41 by means of a division wall 45. The inner end of the plunger rod 21 is beveled as at 46 and is adapted to engage a similarly beveled portion 47 on the piston 14.

Formed integral with one end of the piston 14 is an annular internal boss 48 having a passageway 49 communicating with the hollow interior 50 of said piston to allow fluid passage therethrough during the initial operation of the plunger rod 29. The forward end of the piston 14 is formed with enlarged internal bosses 51 thereby providing a reduced bore 52 having inwardly directed spider arms 53 for supporting a slide bearing 54. A piston packing groove 55 is formed in the marginal portion of the piston 14 for receiving a self-expanding flexible packing member 56 formed of rubber or "neoprene."

Slidably mounted on the slide bearing 54 is a slide rod 57 having an annular disk valve 58 adapted to close the port 52 of the piston 54 after the piston has been moved a predetermined distance. The disk valve 58 is provided with a rubber sealing element 59 adapted to contact the front wall of the piston and seal the port 52 against fluid passage. A nut 60 is mounted on one end of the rod 57 to retain the rod against displacement and the opposite end is provided with a head 61 forming a stop for the rod 57 against a slide bearing 62 mounted and supported in the outer end of the cylinder 12. The slide bearing 62 is formed integral with inwardly directed annular arms 63 formed on a ring 64 so that the rod 57 will be supported at each end in a slidable fashion.

Encircling the rod 57 is a coil spring 65 having one of its ends mounted in abutting relationship with the spider arm 63 and the opposite end abutting the disk valve 58 to urge said valve into engagement with the valve seat of the piston 14 after a predetermined travel of said piston has taken place.

The master cylinder casing 10 is provided with an annular flange 67 to accommodate a distributor head 68 likewise having formed integral therewith an annular flange 69 adapted to be bolted by means of bolts 70 to the flange 67. Formed integral with the distributor head 68 and extending radially therefrom are connecting members 71 for receiving the tubular fluid conduits 72 for conducting fluid under pressure to the brake mechanisms of the vehicle which will be described later. It is to be noted that the distributing head 68 is cut away as at 73 to provide a chamber for receiving the slide bearing supporting ring 64 and similarly, the end wall of the master cylinder casing 10 is chambered as at 74 for receiving the opposite side of said ring 64. Packing elements may be received in the chamber portions 73 and 74 to seal the joints against fluid passage.

A threaded boss 75 is formed integral with the master cylinder casing 10 and is provided with an internally threaded bore 76 for receiving a closure plug 77 to facilitate filling of the system with a fluid such as glycerin and a combination of glycerin and oil. The internally screw-threaded bore 76 communicates with a chamber 78 likewise in communication with the chamber 43 of the differential cylinder 11.

Formed integral with the master cylinder casing 10 is a compensating cylinder 79 having circumferentially spaced bosses 80 provided with internal threaded bores 81. Mounted on and secured to the enlarged bosses 80 is a casing section 82 having a flange 83 adapted to be bolted in place by means of bolts 84. The casing section 82 is tapered inwardly to provide a reduced section 85 and said casing section 82 is provided with a tapered bore 86 communicating with an axial bore 87 formed in the reduced portion 85.

Bolted to the casing section 82 is a tubular portion 88 having a bore 89 alined with the axis of the cylinder 79 and said tubular portion 88 is provided with a flange 90 adapted to be bolted to the reduced portion 85 of the casing section 82 by means of bolts 91.

Mounted in the bore 89 of the tubular member 88 is a downwardly depending sleeve 92 having a central bore 93 and said sleeve 92 is adapted to slidably support a piston 94 on the lower end thereof as clearly shown in Fig. 1.

The piston 94 is reciprocably mounted in the compensating cylinder 79 and is provided with a telescopic sleeve 95 slidably guided on the lower end of the sleeve 92 so that the piston 94 may move up and down thereon to compensate for the expansion and contraction of the brake fluid in the brake system. The bottom wall 96 of the cylinder 79 is provided with a boss 97 having a port or passageway 98 communicating with the differential cylinder 12 in front of the piston 14. A spring 99 has one end encircling the boss 97 at its opposite end received in an annular recess 100 of the piston 94 to urge the piston upwardly within the cylinder 79.

Formed in the lower portion of the tubular member 88 is an annular recess 101 for rotatably receiving a collar 102 having a disk-like portion 103 provided with diametrically opposed downwardly depending cam portions 104. The disk-like portion 103 is provided with a radially extending handle portion 105 which projects through a slot 106 formed in the reduced portion 85 of the tapered casing section 82. The cutaway portion or slot 106 is of a predetermined length as indicated in Fig. 2 to allow rotation of the collar 102 a slight distance in either direction.

Slidably mounted in the bore 87 and encircling the sleeve 92 is a similar collar 107 shown in Figs. 4 and 5 and said collar 107 is provided with diametrically opposed lugs 108 for being slidably received in diametrically opposed grooves 109 formed in the tapered casing section 82 and extending longitudinally within the reduced portion 85 thereof. The collar 107 is formed with sector shaped projections 109a which are interrupted by diametrically opposed spaces or recesses 110 and it is to be noted that the projecting cams 104 on the collar 103 are positioned so as to be received within said recesses 110 to allow the disk-like portion 103 or collar 102 and the sector shaped projection 109 to contact when the handle 105 is moved a predetermined distance.

The underside of the collar 107 is annularly recessed as at 111 for receiving one end of a coil spring 112, as shown clearly in Fig. 1. The coil spring 112 encircles the interlocking guide sleeve 95 of the piston 94 and at its opposite end is mounted in abutting relationship with a circular boss 113 formed on the top wall of the piston 94. The piston 94 is provided with a packing groove 114 for receiving a self-expanding sealing ring 115 similar to the pistons 13 and 14 so that the expansion of the piston rings 115 will cause the outer periphery thereof to tightly and closely engage the inner wall of the cylinder 79.

The upper end of the guide sleeve 92 is internally threaded as at 116 and is adapted to receive a threaded nipple 117 formed on a bleed valve 118 for the purpose of removing air from the system. The bleed valve 118 is provided with a lateral projection 119 having an internally threaded bore 120 for receiving a threaded plug 121 the outer end of which is formed polygonal as at 122 for receiving a wrench or the like while the opposite end is pointed to provide a needle valve 123 adapted to seat in a valve seat 124 formed in the valve. A bleed duct 125 is formed in the bleed valve 118 and communicates the interior of the cylinder 79 with the atmosphere through the axial and radial ports 130 and 131 respectively in the needle valve 121.

The distributor head 68 is adapted to supply fluid under pressure to the plunger cylinders of the brake construction and as shown in Fig. 1, the usual brake drum 132 is provided with oppositely disposed expanding brake shoes 133. Pistons 134 are carried by the brake shoes 133 and are adapted to be mounted in opposite cylinders 135 formed integral with a casing 136. The casing is provided with ports 137 communicating with the cylinders 135 and a connection nipple 138 is threaded in the casing 136 for supplying fluid under pressure to the ducts 137 and opposed cylinders 135. Coil springs 139 are connected to the opposite brake shoes 133 to normally hold the same retracted when the brakes are not applied. A bleed valve 140 is mounted in the casing 136 as usual to allow the removal of air from the system when replenishing the brake fluid to insure maximum efficiency and the effective operation of the brakes.

It is to be noted that the coil spring 99 is smaller than the coil spring 112 so that when pressure is exerted upon the spring 112 by the rotation of the collar 102 and the removal of the cam portions 104 from the recesses 110 the pressure of the spring 99 will be overcome sufficiently to move the piston 94 downwardly a proportionate distance.

In Figs. 8 to 12 inclusive there is shown a modified form of the invention and the reference characters 141 are generally being employed to designate the master cylinder casing having a bore 142 for receiving one of the differential pistons 143. The master cylinder casing 141 is enlarged as at 144 to provide a differential cylinder 145 for slidably receiving a piston 146 similar to the piston 13 as shown in Fig. 1. The piston 146 is provided with a central bore 147 surrounded by an annular sleeve 148 which is slidably mounted on the plunger rod 149 in the usual manner. An annular flange 150 is formed on the differential cylinder 144 for receiving the flange 152 in a cylindrical housing 153 the free end of which is formed into an annular boss 154 having a bore 155 for the projection of the plunger rod extension 157. The plunger rod 149 is formed identical to the plunger rod 21 shown in Fig. 13 hollow for a portion of its length at the end as at 158 and has its end internally threaded as at 159 for receiving an enlarged threaded member 160 having an elongated threaded portion 161 threadedly received in a horizontal opening in the plunger rod extension 157. The plunger 149 is formed with a reduced portion 162 upon which is slidably mounted a collar 163 having a flange 164 against which abuts one end of the coil spring 165 so that the opposite end may abut an annular flange 166 formed integral with the plunger rod extension 157. The coil spring 165 is compressed between the flange 164 and the annular flange 166 by assembling the spring on one end of the plunger rod extension 157 and then tightly connecting the portion 161 with the longitudinal threaded bore therein.

The piston 146 is formed with inner and outer sealing ring receiving grooves 167 and 168 respectively in which is mounted self expanding sealing rings 169 and 170 in concentric relation so that the sealing ring 169 will be expanded into engagement with the plunger rod 149 while the sealing ring 170 will be similarly expanded into engagement with the internal wall 145 of the cylinder 144. It is to be noted that the casing housing 153 is provided at one end adjacent the flange 152 with an internal cutaway portion 171 and is enlarged as at 172 at circumferentially spaced locations providing sockets 173 for receiving coil springs 174. The coil springs 174 are adapted to engage the ring member 175 having circumferentially spaced recesses 176 formed on one face thereof and as shown in Fig. 8 the rotary ring 175 is received in a groove 177 formed in the rear wall of the piston 146. A handle 178 is formed integral with the rotary ring 175 and said handle projects through a cutaway portion 179 formed in the annular flange 152 as shown in Fig. 10 thereby providing a sector-shaped slot of predetermined length to facilitate the rotation of the ring 175 in both directions.

The bottom wall of the annular recess 177 is provided with circumferentially spaced cam projections 180 adapted to aline with the recesses 176 when the rotary ring 175 is at the limit of one of its two rotational directions. Normally, with the piston 146 in its retracted position the rotary ring 175 will be received in the annular groove 177 as shown in Fig. 8. However, when the piston 146 is moved forwardly the rotary ring will be moved out of the groove 177 during brake applications. On the other hand, when the piston 146 is in its retracted position the cam projections 180 will engage the face of the rotary ring 175 and prevent the piston 146 from moving rearwardly to a position of the plunger release.

The master cylinder casing 141 is provided with an enlarged boss 181 having a threaded filler opening 182 adapted to be closed by a filler plug 183. The filler opening 182 communicates with a chamber 184 in direct communication with the differential cylinder 144. The plungers 150 and 152 of the differential cylinder 144 and housing 153 respectively are secured together in the usual manner by bolts or the like as at 185.

In the modified form of the invention shown in Fig. 13, the master cylinder housing 186 is likewise similar to the master cylinder housings 10 and 141 in Figs. 1 to 12 inclusive and includes differential cylinders 187 and 188 formed integral in axial alinement. The cylinder 187 is provided with a hollow reciprocable piston 189 having an annular enlargement 190 presenting a beveled seat 191 adapted to be engaged by the beveled end 192 and the plunger rod 193. The plunger rod 193 is centrally hollowed and divided by a division wall 194 to form chambers 195 and 196 on opposite sides thereof. The cylinder 188 has communication with the hollow piston 189 through the chamber 196 by way of the ports 197 formed in the plunger 193. Slidably mounted on the plunger rod 193 is a piston 199 having a guide sleeve 200 slidable on the plunger whereby said piston may be free until the plunger 193 has moved a predetermined distance. The pressure wall of the piston is provided with concentric packing grooves 201 and 202 for receiving self expansible packing rings 203 and 204 respectively. The packing ring 203 is adapted to be expanded into sealing engagement with the plunger 193 while the packing ring 204 is expanded into sealing engagement with the bore of the cylinder 188.

Mounted on one end of the differential master cylinder 186 is a plunger rod housing 205 having an inclined wall 206 terminating in an annular flange 207 adapted to be bolted to a flange 208 on the master cylinder casing 186 by means of bolts 209. The free end of the plunger rod housing 205 terminates in a reduced annular portion 210 having a bore 211 for allowing the free sliding movement of the plunger rod extension 212.

The outer end of the plunger rod extension 212 is provided with an aperture 213 for connection with the usual brake pedal linkage. The opposite end of the plunger rod extension is connected to the plunger 193 by means of a threaded member 214 received in an internally screw-threaded portion of the bore 195. Similarly, the inner end of the plunger rod is internally bored and threaded for receiving relatively long threaded projections formed on the threaded member 214.

Slidably mounted on a reduced portion 215 of the plunger rod 193 is a thimble 216 having a flange 217 at one end for receiving one end of a coil spring 218 encircling the plunger rod 193 so that the opposite end of the spring will abut an annular flange 219 formed integral with the plunger rod extension 212.

The thimble 216 is limited against longitudinal movement in one direction by engaging the shoulder 220 on the plunger rod 193 and the flange 217 is spaced from the sleeve 200 a slight distance so that the plunger rod 193 may move a corresponding distance during the initial portion of its stroke before engaging and moving the piston 199.

A filling chamber 221 is formed in the master cylinder casing 186 and provides a reservoir in communication with the cylinder 188. The reservoir 221 may be filled through a filler opening 222 which is suitably threaded for receiving a closure plug 223.

Formed integral with the master cylinder casing 186 is a sealing pressure cylinder 224 having a duct 225 formed in its bottom wall to establish communication between the sealing pressure chamber and reservoir 221 as well as the cylinder 188.

Reciprocably mounted in the cylinder 224 is a piston 226 having a central spherical socket portion 227 for receiving a spherical connection 228 formed on the lower end of a screw-threaded rod 229. The sealing pressure cylinder 224 is open at its upper end and is internally screw-threaded for receiving an end closure member 230 having a threaded portion 231 for being threaded in the upper end of the sealing cylinder. Formed on the closure member 230 and centrally thereof is an internally screw-threaded boss 232 in which the threaded rod 229 is adjustably mounted to facilitate the adjustment of the piston 226 when the handle 233 on the upper end of the screw-threaded rod is rotated.

The piston 226 is provided with an annular packing groove 235 for receiving a self-expanding packing ring 236 similar to the packing rings 203 and 204. It is obvious that other movable elements of the brake system may be provided with self-expanding piston packings, such as the brake expanding pistons for moving the brake shoes into engagement with the brake drum.

*Operation of the form of the invention shown in Figures 1 to 7*

For a consideration of the operation of the invention, it will first be assumed that the brake shoes 133 are retracted by the retention springs 139 and it is desired to apply the brakes of the vehicle to bring the same to a stop. As usual, the vehicle brake pedal is depressed causing the plunger rod extension 29 to move to the right whereupon the operating piston 14 will be moved a corresponding distance while the differential piston 13 will remain at rest in its position as shown in Figure 1. During the initial movement of the plunger rod extension 29 and plunger rod 21, the valve 58 will remain open thereby allowing the initial movement to take place against a relatively small amount of pressure.

Upon continued movement of the plunger rod 21, the valve 58 will have engaged the seat of the bore 52 in the piston 14 to thereby close the passage of fluid therethrough. At the instant the valve 58 is seated, the flange 37 on the sleeve 36 engages the piston sleeve 20 causing the plunger rod and piston 23 to move unitarily. As the pistons 13 and 14 move forward in their respective cylinders, a large volume of fluid in the cylinder 11 is forced through the passageways 42, through the longitudinal bore 41 and hollow piston 14. As this movement occurs, the fluid thus under pressure will overcome the tension of the coil spring 65 and allow the fluid to pass through the part 52 and past the valve 58.

When the pressure has thus been built up in the cylinder 12 on the pressure side of the piston 14, continued movement of the plunger rod 21 causes the valve 58 to be closed whereupon the piston 13 will slide relative to the plunger rod 21 due to the differential pressures in the cylinders 11 and 12. The plunger rod may be moved still further to cause the piston 14 to develop a high pressure in the brake system and during this further movement to effectively set the brakes 133, the coil spring will be compressed against its initial compression by reason of the flange 37 engaging the sleeve 20 and the trapped fluid under pressure in the opposite side of the piston 13.

During the above mentioned braking operation, the port 98 will be covered after the initial movement of the piston 14 to thereby cut off communication between the pressure cylinder 12 and compensating cylinder 79. However, when the brakes are retracted, the port 98 will connect the respective cylinders 12 and 79 so that expansion and contraction of the brake fluid in the system due to variation in temperature changes will be compensated for.

When the brakes are thus applied, the self-expanding packing rings 16, 18 and 56 will be expanded into tight sealing engagement with their cooperative surfaces to insure against the loss of fluid under pressure. However, when the brakes are at rest, and the parts of the multi-stage compressor are in the position as shown in Fig. 1, a sealing pressure will be applied to the various self-expanding packing elements to retain the same in a partially expanded position sufficient to prevent the escape of fluid from the system. This may be accomplished by rotating the collar 103 a sufficient distance by the handle 105 to cause the cam projections 104 to move out of the recesses 110 and thereby move the complemental collar 107 downwardly against the coil spring 112. This added tension placed on the piston 94 will cause the piston to move downwardly against the action of the coil spring 99 a sufficient distance to create a sealing pressure in the system incapable of overcoming the tension of the coil springs 139, of the brake shoes 133. It has been found in practice that a pressure of 25 pounds would be sufficient to expand the packing rings 16, 18 and 56 during non-use of the brakes to prevent escape and leakage between the respective pistons and their cylinders.

It is intended to move the handle 105 to position the depending cams 104 in registry with the recesses 110 of the collar 107 to allow retraction of the piston 94 when the system is being filled with brake fluid to insure the proper filling of the master cylinder and other parts of the system. After the brake cylinders and master cylinders have been filled, the handle 105 is turned to cause the cam projection 104 to move out of the recesses 110 and thereby induce the sealing pressure in the system. Once the sealing pressure has been established, the brake system will not require any attention other than the usual check-up as is the present practice to maintain adequate brake fluid in the system.

*Operation of the form of the invention in Figures 8 to 12 inclusive*

The operation of the multi-stage compressor 141 is basically the same as the form shown in Figs. 1 to 7 inclusive. That is, the pistons 143 and 146 are operated in the same manner when brake applications are made and the pressure developed in the system acts upon the brake shoes expanding pistons. The invention in Figures 8 to 12 inclusive includes the development of the sealing pressure within the system by manipulating the cam ring 175 in such a manner as to advance the piston 146 a sufficient distance to create a sealing pressure in the system whereby the expansible sealing rings 169 and 170 will be urged into sealing contact with their cooperating parts. It is to be noted that the cam ring 175 is engaged by the coil springs 174 at equidistantly circumferentially spaced points so that the springs will exert their pressure on the piston 146 when turned so as to move the recesses 176 out of alinement with the cam projections 180. Slight axial movement of the operating ring 175 is allowed to facilitate the action of the coil springs 174 thereon. After the system has been filled with brake fluid as described, in connection with Figs. 1 to 7 inclusive, the operating ring 175 is rotated to the position shown in Fig. 9 from a position in which the recesses 176 and cam projections are in alinement to advance the piston 146. After the operating ring is thus moved, the coil springs 174 exert a pressure on the piston 146 to create a sealing pressure in the system to facilitate the expansion of the sealing rings 169 and 170 when the system is at rest. The sealing pressure is maintained at all times and is only released during the filling operation to insure complete filling of the system.

*Operation of the form of the invention in Figure 13*

Likewise, the operation of the multi-stage compressor 186 is identical to the operation of the forms of the invention shown in Figures 1 to 7 and 8 to 12 inclusive. The invention in Figure 13 is depicted in the form of a manually controlled and adjustable piston 226 reciprocably mounted in a cylinder 224 having communication with the differential cylinders of the multi-stage compressor through a duct 225. It will thus be seen that by manipulating the handle 233 the piston 226 may be advanced or retracted to create a sealing pressure in the system or to relieve the pressure during filling. When the piston 226 is advanced, a sealing pressure is created in the cylinder of the multi-stage compressor as well as in the entire brake system to cause the sealing rings 203 and 204 to be expanded into tight engaging relationship with the packing grooves 201 and 202 and the operating plunger 193 and wall of the cylinder 188. As in the other forms of the invention, the sealing pressure developed by the piston 226 is maintained constantly and is insufficient to overcome the brake shoe retention springs thereby preventing brake scuffing or dragging.

In the forms of the invention herewith shown and described, it is to be understood that various changes in the shape, size and arrangement of parts may be resorted to without departing from the spirit of the invention or the scope of the subjoined claims.

What I claim is:

1. In combination with a fluid brake system having brake expanding pistons and a compressor therefor, an independent cylinder formed integral with said compressor and in communication therewith, a piston in said cylinder, a cam ring for advancing said piston, manual means for operating said cam ring and flexible expansible sealing rings for said compressor responsive to the pressure created by the independent piston whereby said sealing rings will be expanded between periods of brake application.

2. In combination with a fluid brake system having brake expanding pistons and a compressor therefor also including a piston, a cylinder formed integral with the compressor having a port to establish communication therewith adapted to be closed after a predetermined travel of said compressor piston, a compensating piston mounted in said cylinder, a cam member located at one end of the cylinder, a spring interposed between the cam member and compensating piston, manual means for operating the cam member for compressing said spring and advancing said compensating piston and flexible expansible sealing elements for said compressor piston and compensating piston responsive to the pressure developed by the compensating piston to maintain the sealing elements expanded between periods of brake application.

3. In combination with a fluid brake system having brake expanding pistons and a compressor therefor, an independent cylinder formed integral with the compressor and having communication therewith, a piston in said cylinder, a cam ring having cam projections mounted for partial rotation at one end of the cylinder, a collar mounted above the piston having recesses for securing said cam projections, a coil spring interposed between the piston and collar, manual means for partially rotating the cam ring to move said cam projections out of said recesses to compress the coil spring and advance the pistons and flexible expansible sealing elements for the compressor and piston responsive to the pressure created by the advancing of the piston to maintain said sealing elements expanded between periods of brake application.

CLAUDE SAUZEDDE.